April 11, 1950   F. GRUSZECKI   2,503,729
ELECTRIC WELDING TORCH
Filed Nov. 8, 1947
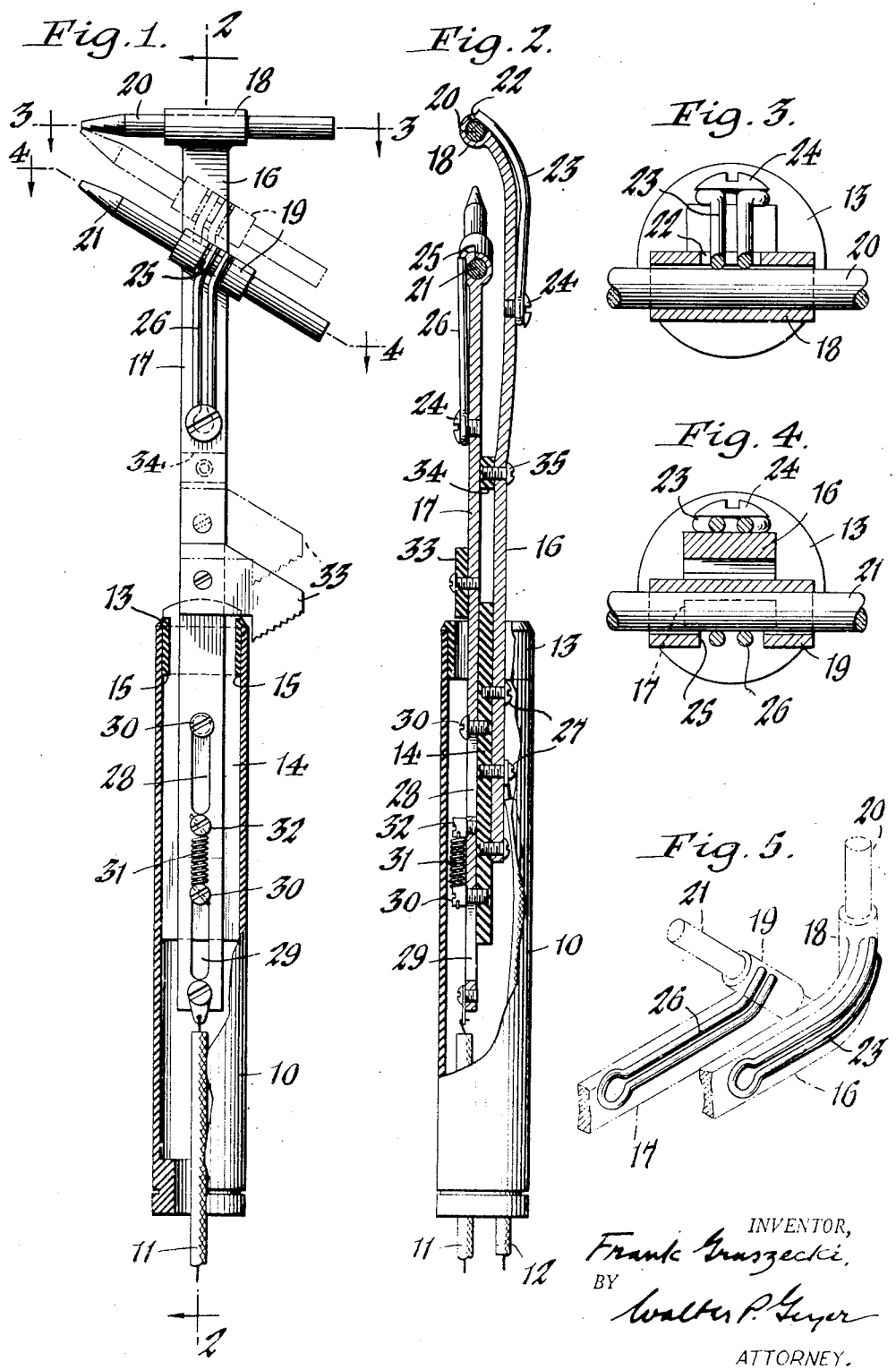
INVENTOR,
Frank Gruszecki,
BY Walter P. Geyer
ATTORNEY.

Patented Apr. 11, 1950

2,503,729

UNITED STATES PATENT OFFICE 2,503,729

ELECTRIC WELDING TORCH

Frank Gruszecki, Buffalo, N. Y., assignor of one-half to Henry Rothenberg, Buffalo, N. Y.

Application November 8, 1947, Serial No. 784,899

3 Claims. (Cl. 219—14)

This invention relates to an electric welding torch and more particularly to manually controlled arc-welding torches.

The objects of the invention are to provide an improved arc-welding torch having simple, reliable and convenient means for adjustably clamping the carbons or electrodes on the tool; to provide a simpler and quicker means to close the electrodes together in establishing the arc; to provide a welding torch that is compact, light in weight, easy to manipulate, and simple and inexpensive in construction.

Other features of the invention reside in the construction and arrangement of parts hereinafter described and particularly pointed out in the appended claims.

In the accompanying drawings—

Figure 1 is a side elevation of the torch with a portion of the handle casing broken away to reveal the interior construction. Figure 2 is a longitudinal section taken on line 2—2, Figure 1. Figures 3 and 4 are enlarged fragmentary cross sections taken on the correspondingly-numbered lines in Figure 1. Figure 5 is a perspective view of the two spring clips and their relationship to the front end of the torch which is shown in dot-dash lines.

Similar characters of reference indicate corresponding parts throughout the several views.

Referring now to the drawings showing the preferred embodiment of my invention, it comprises a tubular or cylindrical, non-conductive handle 10 on which the work parts of the tool are mounted and which is open at its rear end to receive electric lead-in wires 11 and 12. The forward end of the handle 10 is fitted with a detachable, non-conductive ring or insert 13 which serves as a means to hold a non-conductive strip or member 14 in proper position lengthwise and diametrically within the handle 10. The forward end of this strip may be notched, as indicated at 15, to secure ring insert 13 in place.

Two relatively movable bars or conductors 16 and 17 extend longitudinally from the handle 10 on opposite sides of the division strip 14 and have at their outer ends two tubular tips or holders 18 and 19, respectively, in which to support the carbon electrodes 20 and 21. The tubular tip 18, which projects forwardly of the companion tip 19, extends at substantially right angles to the longitudinal axis of the bar 16 and is provided intermediate its ends with a notch 22 in intersecting relation to the bore of such tip to receive the ends of a spring clip or jaw 23 which is fixed to the outer side of the bar by means of a screw 24. The ends of the clip 23 curve inwardly to conform with the curvature of the forward end of bar 16 and terminate in registering relation with the notch 22, where, when an electrode is inserted, the spring clip provides an effective clamping action to hold the electrode 20 firmly in place and yet provide for the ready adjustment of the electrode axially of its supporting tip.

The tip 19 is located at the forward end of the companion bar 17 in spaced longitudinal relation to the tip 18; and extends at an angle of substantially 60 degrees to the longitudinal axis of the bar and is provided intermediate its ends with a notch 25 to receive the ends of a spring clip 26, similar to the clip 23, which is fixed to the outer side of the bar by means of a screw 24. The free ends of the clip 26 curve slightly upwardly into the notch 25 at right angles to the tip 19, where, as described before, they produce a clamping action against the electrode 21. Each of the clips 23, 26 is preferably made of wire and bent upon itself, as shown in Figure 5, to provide a fastening loop or eye at its inner end.

The bars 16 and 17 are arranged substantially parallel and are mounted for relative longitudinal movement at their inner ends on opposite sides of the strip 14. The bar 16 is rigidly secured to one side of the bar 14 by screws 27 and one of the latter serves as an electric terminal to which the lead-in wire 12 is attached. The bar 17 is movably or slidably connected to the other side of the strip 14 and has two slots 28 and 29 therein which are engaged by fastening screws 30, one of the latter serving as an electric terminal to which the lead-in wire 11 is attached. An expansion spring 31 is connected at one end to one of the screws 30 and at its other end to a screw 32 fixed to the bar 17 in order to allow the movable bar 17 to normally retract and bring its electrode 21 from the companion electrode 20 and break the arc when the operator so desires.

For manipulating the slidable bar 17, a thumb piece 33 is fixed thereto in such a position that it extends over the front end of the handle 10 where the operator's thumb would be during the holding of the tool for a welding process, and by exerting a forward thrust to the serrated face of this thumb piece the bar 17 will slide forwardly relatively to the companion bar 16 and bring the electrodes into proper arcing relation. Between the opposing faces of the bars 16, 17 is a non-conductive spacer or insulator 34 which is fixed to one of the bars by a screw 35, as shown in Figure 2, and maintains these bars in their proper laterally-spaced relation.

I claim as my invention:

1. An electric welding torch, comprising a tubular handle, an insulating strip disposed lengthwise and centrally in the bore of the handle, relatively movable conductor bars supported at their inner ends at opposite sides of said strip and terminating at their outer ends in electrode holders disposed in spaced relation with one in advance of the other, means fitted in one end of said handle for detachably retaining said strip therein, means connected to one of said bars for normally urging it rearwardly to a retracted, non-arcing position, and a thumb-engaging member applied to said retractible bar in correlation to the front end of said handle for projecting such bar forwardly to an arcing position.

2. An electric welding torch, comprising a handle, conductor bars extending forwardly from said handle for relative movement lengthwise thereof, each of said bars having a tubular electrode holder at its front end provided with a side notch intersecting the bore thereof, and a spring-like clamping member of substantially U-shape secured at one end to each bar and having its side arms paralleling said bar with the free ends thereof in register with said holder-notch and in clamping engagement with and for adjustably retaining the companion electrode in its arcing position.

3. An electric welding torch, comprising a tubular handle, and an electrode holder assembly removably mounted therein and including a supporting strip of insulating material disposed lengthwise within the handle and substantially axially thereof, means fitted in one end of said handle for detachably retaining said strip therein, conductor bars mounted on opposite sides of said strip for projection forwardly from the handle and terminating at their outer ends in electrode holders, one of said bars being fixed to said strip and the companion bar being longitudinally slidable thereon, a spring connected to said slidable bar to normally retract it to a non-arcing position, and a thumb-piece mounted on said slidable bar forwardly of the front end of said strip and having a portion overhanging the front end of the handle in the retracted position of the slidable bar.

FRANK GRUSZECKI.

REFERENCES CITED

The following references are of record in the file of this patent:

UNITED STATES PATENTS

| Number | Name | Date |
|---|---|---|
| 1,638,978 | Bourne et al. | Aug. 16, 1927 |
| 2,102,546 | Schatz | Dec. 14, 1937 |
| 2,253,994 | Barclift | Aug. 26, 1941 |
| 2,387,083 | McCain | Oct. 16, 1945 |
| 2,425,830 | Ross | Aug. 19, 1947 |